Oct. 13, 1925.
R. CONRADER
TANK DISCHARGE DEVICE
Filed May 24, 1921
1,556,760
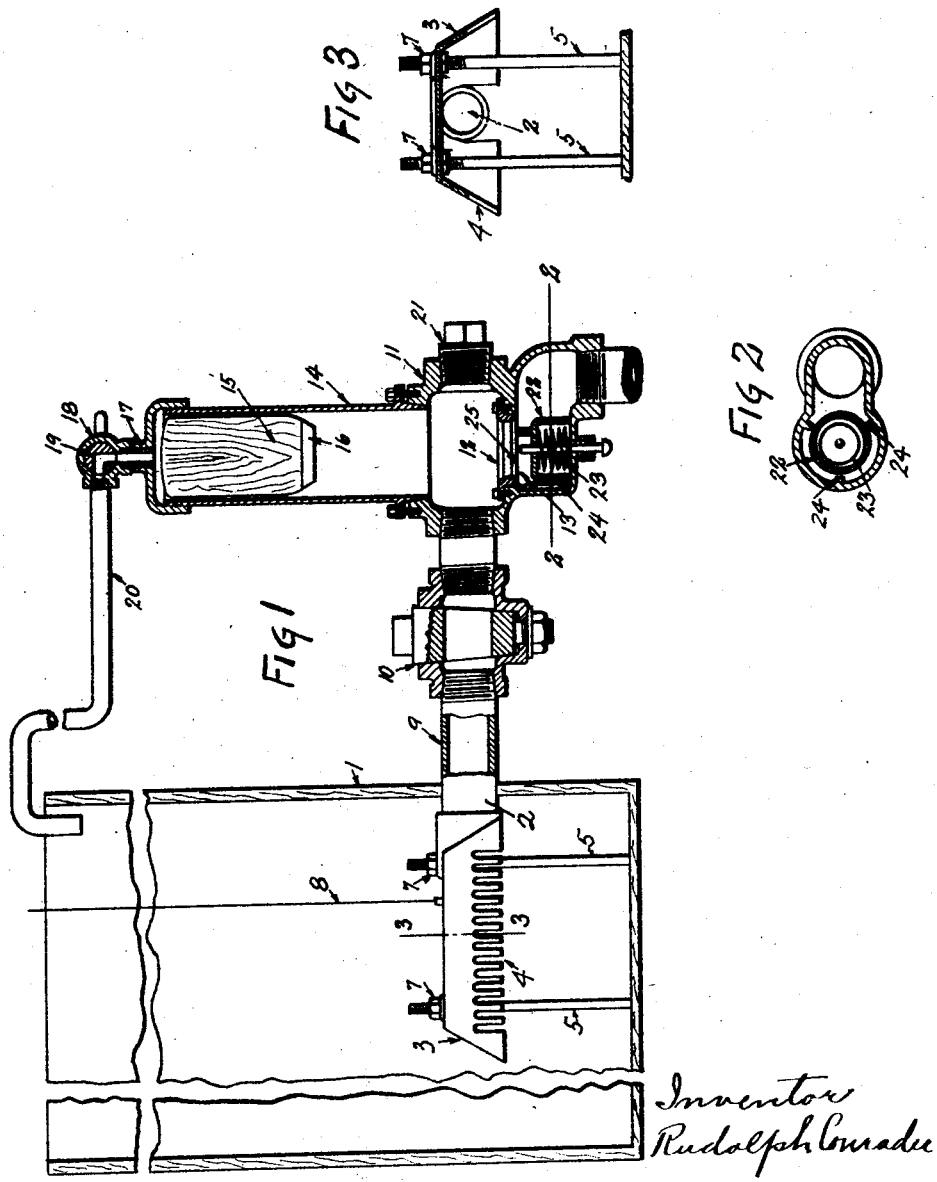
Inventor
Rudolph Conrader
By R. Lord
Attorney Patented Oct. 13, 1925

1,556,760

UNITED STATES PATENT OFFICE.

RUDOLPH CONRADER, OF ERIE, PENNSYLVANIA.

TANK-DISCHARGE DEVICE.

Application filed May 24, 1921. Serial No. 472,043.

*To all whom it may concern:*

Be it known that I, RUDOLPH CONRADER, a citizen of the United States, residing at Erie, in the county of Erie and State of Pennsylvania, have invented new and useful Improvements in Tank-Discharge Devices, of which the following is a specification.

In discharging oil tanks which are connected to pipe lines it is desirable to be able to automatically close off the line prior to the complete emptying of the tank and the filling of the line with air. It is also desirable to be able to clean the discharge mechanism from ice or other accumulation from without the tank. It is also desirable to permit the emptying of the discharge pipe after it has been closed off under certain conditions allowing a predetermined period of time to elapse in the emptying process and to have it operate only under certain conditions. The present invention is directed to features along the lines just above suggested.

The invention is illustrated in the accompanying drawings as follows:—

Fig. 1 is a central section through a tank and discharging apparatus.

Fig. 2 a section on the line 2—2 in Fig. 1.

Fig. 3 a section on the line 3—3 in Fig. 1.

1 marks the tank, 2 the discharge opening, and 3 a plate or guard arranged over the discharge opening to prevent the formation of an air vortex leading to the opening as the liquid approaches the level of the discharge opening. The guard 3 has a strainer 4 along its lower edge, the guard being open at the bottom. The guard is mounted on the rods 5, the rods being screwed through the guard so that it may be adjusted to the height of the discharge pipe and is locked in adjustment by the nut 7. A line 8 is provided by means of which the guard may be lowered into place.

A discharge pipe 9 extends through the opening 2. A manually operated cut-off valve 10 is provided in the pipe 9 and an automatic cut-off valve 11 is provided for the pipe 9. The valve 10 has a seat 12 around the discharge passage 13 through the valve. A float chamber 14 is arranged directly above the seat 12. A float 15 operates in the float chamber and carries a valve disc 16 which operates on the seat 12. In the operation of this device when the oil in the tank reaches a level permitting air to enter the pipe 9, this air passing to the chamber 14 immediately reduces the level of liquid in that chamber so that the valve 16 is brought into the discharge current and immediately closes the valve and this is accomplished before the air passes through the discharge pipe to the line. The chamber 14 is of sufficient height to hold the float normally above the influence of the flow through the discharge opening.

A vent pipe 17 leads from the upper end of the chamber 14. This is controlled by a valve 18 having the plug 19 with the ways adapted to be brought into and out of register with the discharge pipe 17 and a pipe 20 leads from the valve 18 to a position over the tank. When the tank is being filled the vent is open allowing the liquid as it rises to rise in the chamber 14. When the tank is to be discharged the valve is closed so that the level of liquid will remain in the chamber 14 until air reaches the chamber in the manner just above described.

The valve 11 is provided with an opening directly opposite the pipe 9 through which an implement may be inserted for cleaning the pipe 9 of ice or other obstructions, the valve 10 being such that its way can be brought in line with the pipe for this purpose. The under-side of the strainer 4 is open also so as to permit any material forced out of the pipe 9 to fall to the bottom of the tank. The opening through the valve 11 is closed by means of the plug 21.

The check valve 22 is normally lifted to closing position by a spring 23, the valve being controlled by guides 24 and operating on a seat 25 opposite the seat 12. The spring 23 should be very light so that the valve 22 will be very sensitive, in fact, almost floating.

The plate on the top of the strainer which prevents the formation of a vortex above the discharge pipe is important in connection with the operation of the float 15 because without this plate upon the formation of a vortex air is admitted to the chamber 14 so that the valve will be drawn to discharging position due to the air delivered to the pipe through the formation of the vortex. With the plate the tank is discharged in variably to a level corresponding to the upper portion of the discharge pipe. The closing of the valve 16, however, is assured prior to the entrance of air past the seat 12.

It will be noted that during the running of the oil the valve 18 is closed and left closed until the tank is ready for emptying a second time. In the interval the valve 10 is closed. The valves 16 and 24 supplement the valve 10 in preventing any leaking from or to the tank, the valve 16 remaining on the seat and the valve 24 being carried to its seat by the spring during this interval. When the tank is again run the valve 10 is opened and the valve 18 is opened. Immediately the oil rushing in from the tank fills the chamber 14 carrying the float to its upper position. As soon as this is accomplished the valve 18 is closed and remains closed during the operation of closing the tank during the interval.

What I claim as new is:—

1. In a tank discharge device, the combination of a discharge pipe; a cut-off valve on said pipe comprising a casing and valve seat; a closed float chamber; a float in the chamber; a valve seating on the seat and controlled by the float, said float chamber being in communication with the tank through the discharge pipe to permit the introduction of air from the tank prior to the uncovering of the valve seat; and a guard over the discharge pipe preventing a vortex leading to the discharge pipe.

2. In a tank discharge device, the combination of a discharge pipe; a closing valve on said pipe comprising a casing and seat; a float chamber above the seat; a float in the chamber; a valve controlled by the float and seating on the seat; and a check valve operating on the opposite side of the seat from the first mentioned valve.

3. In a tank discharge device, the combination of a discharge pipe; a cut-off valve on said pipe comprising a casing and valve seat; a closed float chamber; a float in the chamber; a valve seating on the seat and controlled by the float, said float chamber being in communication with the tank through the discharge pipe to permit the introduction of air from the tank; and a guard over the discharge pipe preventing a vortex leading to the discharge pipe.

In testimony whereof I have hereunto set my hand.

RUDOLPH CONRADER.